United States Patent
Wang (10) Patent No.: US 9,826,350 B1
(45) Date of Patent: Nov. 21, 2017

(54) INDOOR POSITIONING METHOD AND SYSTEM THEREOF PREVENTING SIGNAL TRANSMISSION COLLISIONS

(71) Applicant: WISTRON NEWEB CORPORATION, Hsinchu (TW)

(72) Inventor: Chia-Hsiang Wang, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 0 days.

(21) Appl. No.: 15/421,625

(22) Filed: Feb. 1, 2017

(51) Int. Cl.
*H04W 4/02* (2009.01)
*H04W 72/04* (2009.01)

(52) U.S. Cl.
CPC ......... *H04W 4/02* (2013.01); *H04W 72/0446* (2013.01)

(58) Field of Classification Search
CPC ...... H04L 12/413; H04L 47/28; H04W 72/04; H04W 74/085; H04W 72/0446
See application file for complete search history.

(56) References Cited

U.S. PATENT DOCUMENTS

| 7,394,364 B2 | 7/2008 | Elliott | |
|---|---|---|---|
| 2015/0163633 A1* | 6/2015 | Mishra | H04W 4/023 455/456.6 |
| 2016/0081114 A1* | 3/2016 | Jung | H04W 72/04 370/329 |
| 2016/0374113 A1* | 12/2016 | Ghosh | H04W 74/085 |

* cited by examiner

*Primary Examiner* — Nizar Sivji
(74) *Attorney, Agent, or Firm* — Li&Cai Intellectual Property (USA) Office (57) ABSTRACT

An indoor positioning system and an indoor positioning method allow all of the wireless base stations and mobile terminals in the same interior space to synchronously generate their time slots. Further, each mobile terminal transmits a positioning signal only at a preset time point in each time slot to prevent collisions between mobile terminals transmitting the positioning signals.

16 Claims, 5 Drawing Sheets

INDOOR POSITIONING METHOD AND SYSTEM THEREOF PREVENTING SIGNAL TRANSMISSION COLLISIONS

BACKGROUND OF THE INVENTION

1. Field of the Invention

The present disclosure relates to an indoor positioning method and an indoor positioning system; in particular, to an indoor positioning method and an indoor positioning system that can prevent signal transmission collisions.

2. Description of Related Art

With the popularization of wireless networks and mobile devices, researchers have made efforts to study the indoor positioning technology. Generally speaking, various communication protocols can be adapted to the indoor positioning technology, such as Wi-Fi, infrared, Bluetooth, ZigBee or the like. Correspondingly, various measurement methods are used for positioning a mobile device indoors, such as Time of Arrival (TOA), Time Difference of Arrival (TDOA), Angle of Arrival (AOA), Received Signal Strength Indicator (RSSI), or the like.

In a conventional indoor positioning method and system, at least one wireless base station has to be pre-configured in an interior space to receive a positioning signal from one mobile terminal configured in the same interior space for positioning the mobile terminal. However, there are usually more than one mobile terminals configured in the same interior space. When two mobile terminals or even more mobile terminals simultaneously transmit their position signals, there will be signal transmission collisions between these mobile terminals, thereby decreasing the positioning precision. Therefore, how to effectively prevent the signal transmission collisions without decreasing the positioning precision is a problem that needs to be solved.

SUMMARY OF THE INVENTION

The present disclosure provides an indoor positioning method for preventing signal transmission collisions, which is adapted to an indoor positioning system. The indoor positioning system includes a wireless base station, a first mobile terminal and a second mobile terminal. The wireless base station, the first mobile terminal and the second mobile terminal respectively have a microprocessor, a memory and a time counter. Each memory is configured to store a reset index. The indoor positioning method includes: enabling the time counters at the same time by the microprocessors of the wireless base station, the first mobile terminal and the second mobile terminal when one of the wireless base station, the first mobile terminal and the second mobile terminal receives a trigger signal, and synchronously generating a plurality of sequential time slots; storing a first identity number in the memory of the first mobile terminal and storing a second identity number in the memory of the second mobile terminal; transmitting a first positioning signal from the first mobile terminal to the wireless base station when the time counter of the first mobile terminal counts to a first preset time point, transmitting a second positioning signal from the second mobile terminal to the wireless base station when the time counter of the second mobile terminal counts to a second preset time point, and positioning the first mobile terminal and the second mobile terminal by the wireless base station according to the first positioning signal and the second positioning signal, respectively. In this indoor positioning method, the time length of each time slot is determined by the reset index. Moreover, the first preset time point and the second preset time point are determined by the first identity number and the second identity number, respectively, and the first preset time point and the second preset time point are within a range from the half of each time slot to the end of each time slot.

The present disclosure further provides an indoor positioning system for preventing signal transmission collisions, which includes a wireless base station, a first mobile terminal and a second mobile terminal. The wireless base station, the first mobile terminal and the second mobile terminal are configured in an interior space. In addition, the wireless base station, the first mobile terminal and the second mobile terminal respectively have a microprocessor, a memory and a time counter, and each memory is configured to store a reset index. The microprocessors of the wireless base station, the first mobile terminal and the second mobile terminal enable the time counters at the same time when one of the wireless base station, the first mobile terminal and the second mobile terminal receives a trigger signal. As a result, the wireless base station, the first mobile terminal and the second mobile terminal synchronously generates a plurality of sequential time slots. A first identity number is stored in the memory of the first mobile terminal, and a second identity number is stored in the memory of the second mobile terminal. A first positioning signal is transmitted from the first mobile terminal to the wireless base station when the time counter of the first mobile terminal counts to a first preset time point. Likewise, a second positioning signal is transmitted from the second mobile terminal to the wireless base station when the time counter of the second mobile terminal counts to a second preset time point. Then, the first mobile terminal and the second mobile terminal are positioned by the wireless base station respectively according to the first positioning signal and the second positioning signal. In this indoor positioning system, the time length of each time slot is determined by the reset index. Moreover, the first preset time point and the second preset time point are determined by the first identity number and the second identity number, respectively, and the first preset time point and the second preset time point are within a range from the half of each time slot to the end of each time slot.

To sum up, by using the indoor positioning system and method provided by the present disclosure, all of the wireless base stations and mobile terminals in the same interior space can synchronously generate their time slots. Further, each mobile terminal transmits a positioning signal only at a preset time point in each time slot, so as to prevent the occurrence of signal collisions between mobile terminals.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

Figure 1:
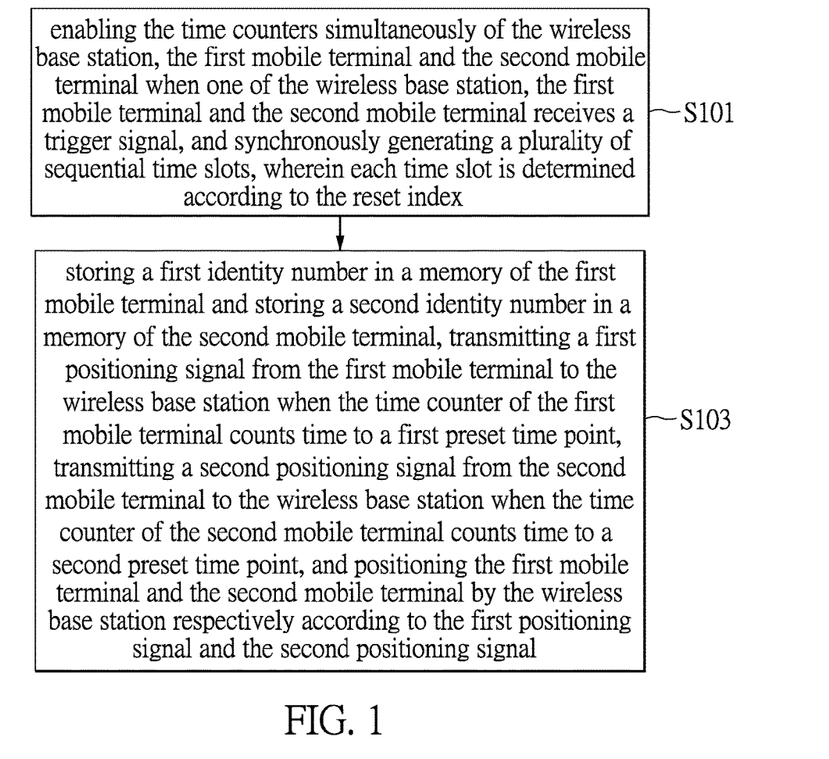
FIG. 1 shows a flow chart of an indoor positioning method for preventing signal transmission collisions in one embodiment of the present disclosure.
Figure 2:
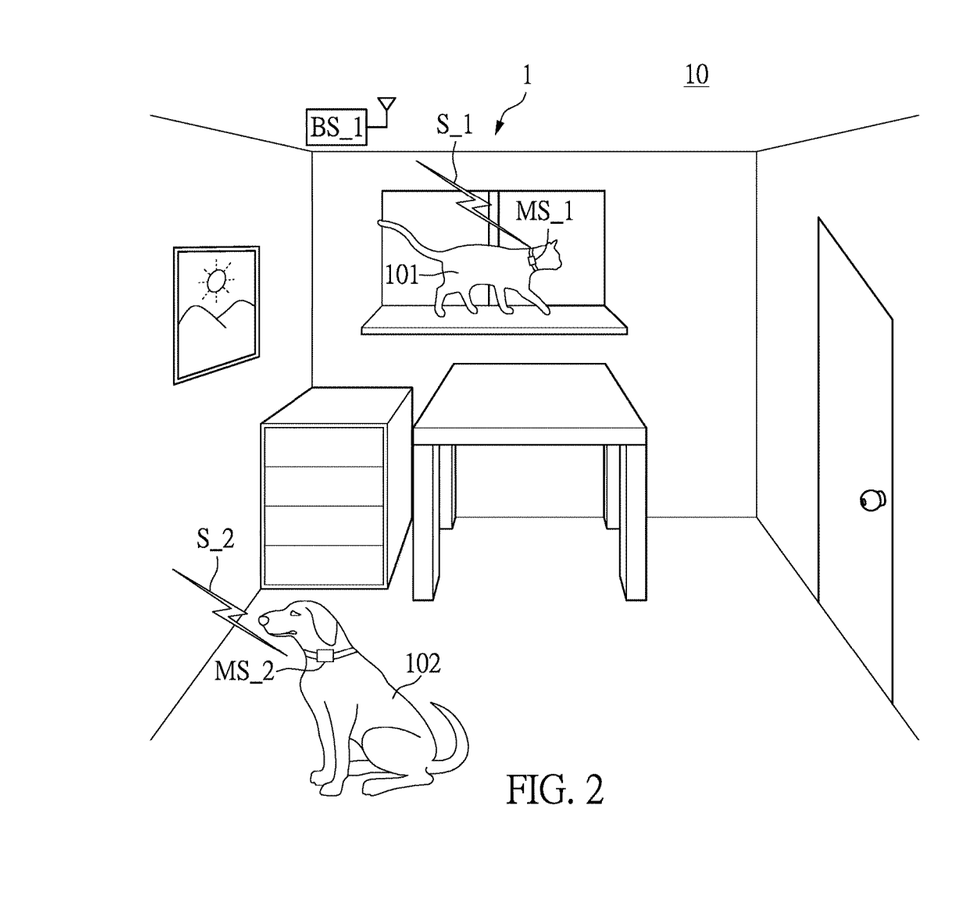
FIG. 2 shows a schematic diagram of an indoor positioning system for preventing signal transmission collisions in one embodiment of the present disclosure.

Referring to FIG. 1 and FIG. 2, a flow chart of an indoor positioning method for preventing signal transmission collisions in one embodiment of the present disclosure is shown, and a schematic diagram of an indoor positioning system for preventing signal transmission collisions in one embodiment of the present disclosure is shown. The indoor positioning method shown in FIG. 1 can be implemented by the indoor positioning system 1 shown in FIG. 2, but it is not limited thereto.

The indoor positioning system 1 includes at least a wireless base station BS_1, a first mobile terminal MS_1 and a second mobile terminal MS_2 configured in an interior space 10. For an easy illustration, the amount of mobile terminals in this embodiment are two, which are the first mobile terminal MS_1 and the second mobile terminal MS_2. However, in practice, the indoor positioning system 1 can include more than two mobile terminals MS_1~MS_N, wherein N is a positive integer greater than 2. Likewise, in practice, the indoor positioning system 1 can include more than one wireless base station.

For example, the indoor positioning system 1 can be used to position a pet that moves in a room (that is, the interior space 10). In this example, the first mobile terminal and the second mobile terminal MS_1, MS_2 can be electronic devices worn on pets 101 and 102, and both the first mobile terminal and the second mobile terminal MS_1, MS_2 can transmit a wireless signal. The first mobile terminal MS_1 transmits a first positioning signal S_1 to the wireless base station BS_1, and the second mobile terminal MS_2 transmits a second positioning signal S_2 to the wireless base station BS_1. In response to the first positioning signal S_1 and the second positioning signal S_2, the wireless base station BS_1 positions the pet 101 and the pet 102. It should be noted that, any kind of communication protocol and any standard of the indoor positioning technology can be adapted to the indoor positioning system 1 and the indoor positioning method illustrated in this embodiment.

In a conventional indoor positioning system, different periods of signal transmission are set for different mobile terminals to prevent signal transmission collisions between different mobile terminals. For example, if one mobile terminal transmits a positioning signal every 20 ms, another first positioning signal may be set to transmit a positioning signal every 30 ms. In this manner, the positioning signals transmitted by these two mobile terminals can be clearly distinguished most of the time. However, every 60 ms, these two mobile terminals will simultaneously transmit a positioning signal, and it would be hard to distinguish the positioning signals transmitted by these two mobile terminals under this circumstance.

To solve the above problem, in this embodiment, the first mobile terminal MS_1 and the second mobile terminal MS_2 synchronously generate time slots, and the first mobile terminal MS_1 can only transmit a first positioning signal S_1 at a specific time point at each of its time slots and the second mobile terminal MS_2 can only transmit a second positioning signal S_2 at a specific time point at each of its time slots. In this manner, the first mobile terminal MS_1 and the second mobile terminal MS_2 can have different periods of signal transmission. In addition, the timing when the first mobile terminal MS_1 transmits a first positioning signal S_1 and the timing when the second mobile terminal MS_2 transmits a second positioning signal S_2 never collide. It can effectively prevent signal transmission collisions between the first mobile terminal MS_1 and the second mobile terminal MS_2.

Figure 3:
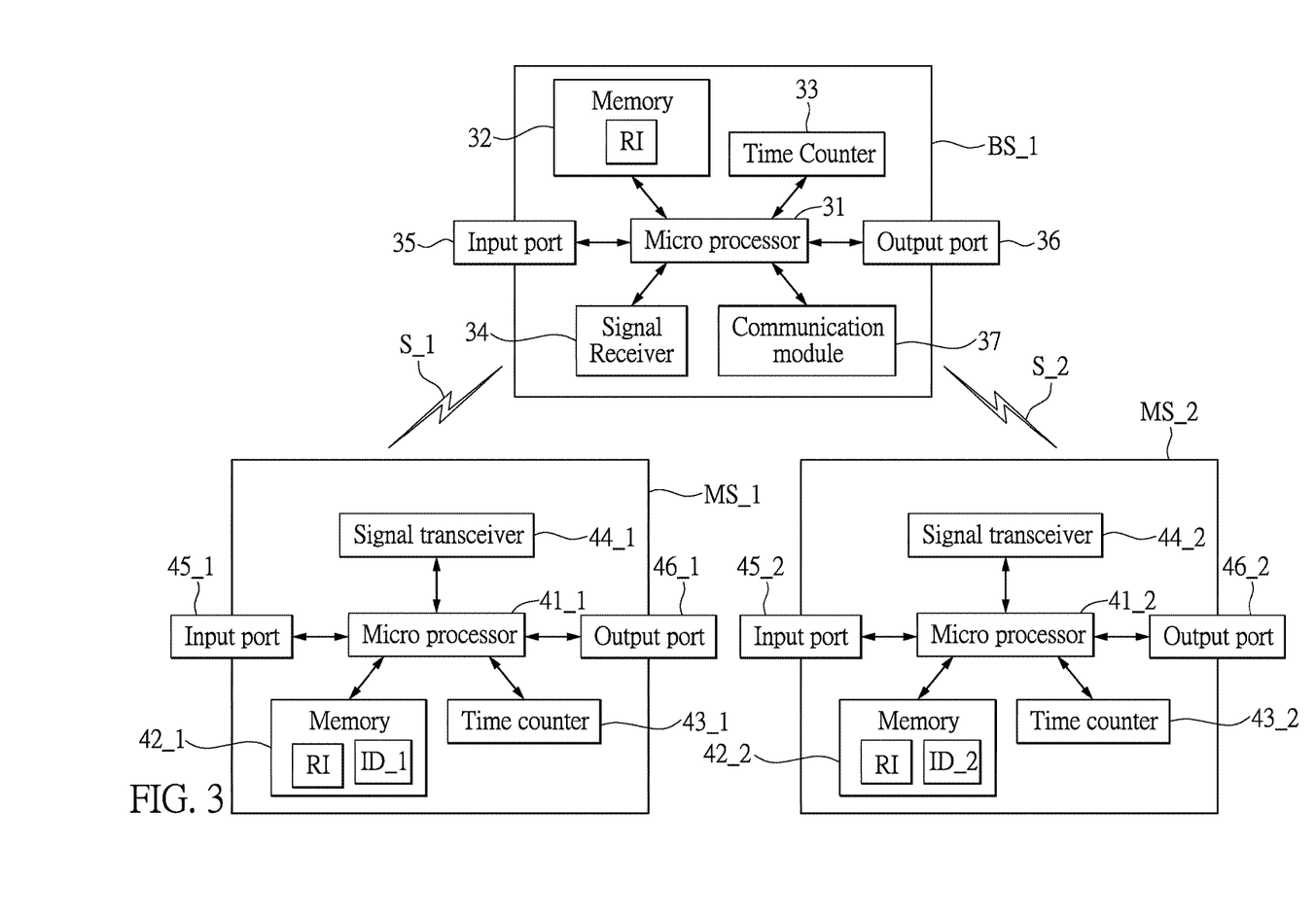
FIG. 3 shows a block diagram of a wireless base station and mobile terminals of the indoor positioning system shown by FIG. 2 in an exemplary embodiment of the present disclosure.

In the following description, details about the operation among the wireless base station BS_1, the first mobile terminal MS_1 and the second mobile terminal MS_2 are further described. Referring to FIG. 3, a block diagram of a wireless base station and mobile terminals of the indoor positioning system shown by FIG. 2 in an exemplary embodiment of the present disclosure is shown.

As shown in FIG. 3, the wireless base station BS_1 includes a microprocessor 31, a memory 32, a time counter 33, a signal receiver 34 and a communication module 37. In addition, the wireless base station BS_1 has an input port 35 and an output port 36. The microprocessor 31, the time counter 33, the signal receiver 34 and the communication module 37 can be implemented in hardware, software, firmware, middleware, or a combination thereof.

Specifically, in response to an input event, the microprocessor 31 of the wireless base station BS_1 obtains a reset index RI that determines the time length of each time slot. The reset index RI is stored in the memory 32 of the wireless base station BS_1. In addition, the signal receiver 34 receives the first positioning signal S_1 from the first mobile terminal MS_1 and receives the second positioning signal S_2 from the second mobile terminal MS_2. According to the first positioning signal S_1 and the second positioning signal S_2, the microprocessor 31 determines where the first mobile terminal MS_1 and the second mobile terminal MS_2 are.

Moreover, through the communication module 37, the wireless base station BS_1 can wiredly or wirelessly transmit information on where the first mobile terminal MS_1 and the second mobile terminal MS_2 are to a user's electronic device (not shown) or a cloud server (not shown). In this manner, the user or the cloud server can learn where the first mobile terminal MS_1 and the second mobile terminal MS_2 are in real time.

Those skilled in the art should be familiar with the operations of the microprocessor 31, the memory 32, the time counter 33, the signal receiver 34, the input port 35, the output port 36 and the communication module 37, and thus the operations of these elements are not described herein. What should be noted is that, from the above, according to an input event, the wireless base station BS_1 obtains a reset index RI that determines the time length of each time slot. In practice, by pushing a button (not shown) configured on the wireless base station BS_1 or by using other tools (not shown), a user can manually input and save a reset index RI in the memory 32 of the wireless base station BS_1, but it is not limited thereto.

For the convenience of explaining the following description, the operation of the first mobile terminal MS_1 is described, while the operation of the second mobile terminal MS_2 is omitted. However, it should be noted that, the operation of the second mobile terminal MS_2 can be similar to or the same as the operation of the first mobile terminal MS_1. Thus, for the first mobile terminal MS_1 and the second mobile terminal MS_2 shown in FIG. 3, like reference numerals refer to similar elements.

As shown in FIG. 3, the first mobile terminal MS_1 includes a microprocessor 41_1, a memory 42_1, a time counter 43_1 and a signal transceiver 44_1. In addition, the first mobile terminal MS_1 has an input port 45_1 and an output port 46_1. The microprocessor 41_1, the time counter 43_1 and the signal transceiver 44_1 can be implemented in hardware, software, firmware, middleware, or a combination thereof. To be brief, the implementation of the first mobile terminal MS_1 is not limited thereto.

Similarly, in response to an input event, the microprocessor 41_1 of the first mobile terminal MS_1 obtains a reset index RI that determines the time length of each time slot generated by the first mobile terminal MS_1. The reset index RI is stored in the memory 42_1 of the first mobile terminal MS_1. In addition, the signal transceiver 44_1 of the first mobile terminal MS_1 transmits a first positioning signal S_1 that has the positional information of the first mobile terminal MS_1. In practice, by pushing a button (not shown) configured on the first mobile terminal MS_1 or by using other tools (not shown), a user can manually input and save a reset index RI in the memory 42_1 of the first mobile terminal MS_1, but it is not limited thereto.

As shown in FIG. 1, the indoor positioning method for preventing signal transmission collisions that is executed by the wireless base station BS_1, the first mobile terminal MS_1 and the second mobile terminal MS_2 in FIG. 2 includes steps as follows. In step S101, when one of the wireless base station BS_1, the first mobile terminal MS_1 and the second mobile terminal MS_2 receives a trigger signal, the time counters 33, 43_1 and 43_2 are enabled at the same time by the microprocessors 31, 41_1 and 41_2 of the wireless base station BS_1, the first mobile terminal MS_1 and the second mobile terminal MS_2 for counting time. Thus, the wireless base station BS_1, the first mobile terminal MS_1 and the second mobile terminal MS_2 synchronously generate a plurality of sequential time slots. The time length of each time slot is determined by a reset index RI.

In step S103, a first identity number ID_1 is stored in the memory 42_1 of the first mobile terminal MS_1 and a second identity number ID_2 is stored in the memory 42_2 of the second mobile terminal MS_2. In addition, the first mobile terminal MS_1 transmits a first positioning signal S_1 to the wireless base station BS_1 when the time counter 43_1 of the first mobile terminal MS_1 counts to a first preset time point in each time slot. Also, the second mobile terminal MS_2 transmits a second positioning signal S_2 to the wireless base station BS_1 when the time counter 43_2 of the second mobile terminal MS_2 counts to a second preset time point in each time slot. Receiving the first positioning signal S_1 and the second positioning signal S_2, the wireless base station BS_1 can position the first mobile terminal MS_1 and the second mobile terminal MS_2.

It should be noted that, the first preset time point T1 and the second preset time point T2 are determined by the first identity number ID_1 and the second identity number ID_2, respectively. Additionally, the first preset time point T1 and the second preset time point T2 are within a range from the half of each time slot to the end of each time slot. In other words, the first preset time point T1 and the second preset time point T2 can be equal to or larger than the half of each time slot, but cannot be larger than the end of each time slot.

In step S101, it is mentioned that, one of the wireless base station BS_1, the first mobile terminal MS_1 and the second mobile terminal MS_2 receives a trigger signal. In practice, this trigger signal can be inputted by pushing a button configured on the wireless base station BS_1, the first mobile terminal MS_1 or the second mobile terminal MS_2, or by using other tools. Thus, a user can manually input the trigger signal to make the microprocessors 31, 41_1 and 41_2 simultaneously enable the time counters 33, 43_1 and 43_2 for counting time.

Figure 4A:
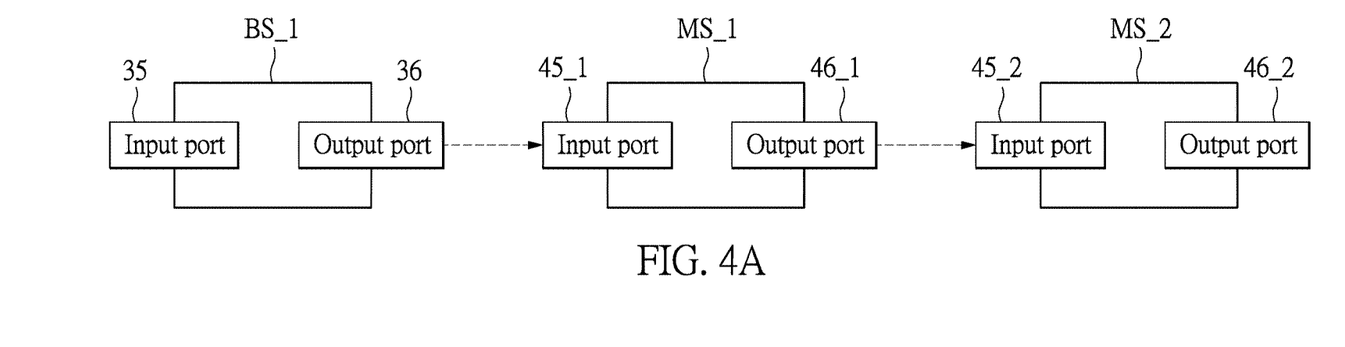
FIG. 4A is a schematic diagram showing how the wireless base station, the first mobile terminal and the second mobile terminal of the indoor positioning system shown by FIG. 2 receive a trigger signal in an exemplary embodiment of the present disclosure.

Referring to FIG. 4A, a schematic diagram showing how the wireless base station, the first mobile terminal and the second mobile terminal of the indoor positioning system shown by FIG. 2 receive a trigger signal in an exemplary embodiment of the present disclosure is shown. In FIG. 4A and FIG. 3, like references indicate similar elements. As shown in FIG. 4A, by connecting one input port to one output port, the wireless base station BS_1, the first mobile terminal MS_1 and the second mobile terminal MS_2 can form a network having a linear topology or a ring topology. For example, a network having a Daisy Chain Topology can be formed by connecting the output port 36 of the wireless base station BS_1 to the input port 45_1 of the first mobile terminal MS_1, and connecting the output port 46_1 of the first mobile terminal MS_1 to the input port 45_2 of the second mobile terminal MS_2.

When a trigger signal is received by any node in the above Daisy Chain (that is, one of the wireless base station BS_1, the first mobile terminal MS_1 and the second mobile terminal MS_2), each node in the Daisy Chain will respond to the trigger signal. For example, the trigger signal may trigger the microprocessor of the node to enable the time counter of the node for counting time. In this example, no matter which node (that is, the wireless base station BS_1, the first mobile terminal MS_1 or the second mobile terminal MS_2) receives the trigger signal, the microprocessors of all nodes (that is, the microprocessor 31 of the wireless base station BS_1, the microprocessor 41_1 of the first mobile terminal MS_1 and the microprocessor 41_2 of the second mobile terminal MS_2) in the Daisy Chain will simultaneously enable their time counters (that is, the time counters 33, 43_1 and 43_2) for counting time.

Figure 4B:
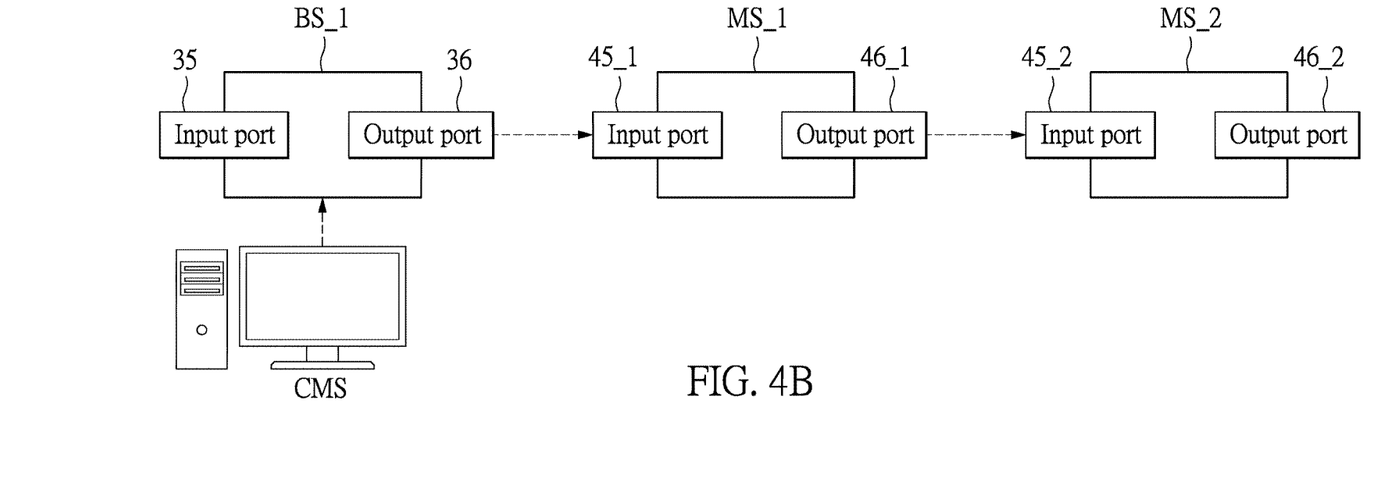
FIG. 4B is a schematic diagram showing how the wireless base station, the first mobile terminal and the second mobile terminal of the indoor positioning system shown by FIG. 2 receive a trigger signal in another exemplary embodiment of the present disclosure.

Referring to FIG. 4B, a schematic diagram showing how the wireless base station, the first mobile terminal and the second mobile terminal of the indoor positioning system shown by FIG. 2 receive a trigger signal in another exemplary embodiment of the present disclosure is shown. In FIG. 4B and FIG. 3, like references indicate similar elements. As shown in FIG. 4B, a trigger signal can be wiredly or wirelessly transmitted from a Central Management Server (CMS) or a user's electronic device (not shown) to any node of the Daisy Chain described above, such that every node in the Daisy Chain will respond to the trigger signal. As illustrated by FIG. 4A and FIG. 4B, there is no restriction on how to make a trigger signal transmitted to one of the wireless base station BS_1, the first mobile terminal MS_1 and the second mobile terminal MS_2, and the way to transmit a trigger signal to one of the wireless base station BS_1, the first mobile terminal MS_1 and the second mobile terminal MS_2 can be freely designed by those skilled in the art.

As mentioned above, a reset index RI determines the time length of each time slot generated by mobile terminals. In an exemplary embodiment, the reset index RI indicates a digit number of the maximum times counted by the time counters 33, 43_1 and 43_2. For example, if the reset index RI is four, and the digit number of the maximum times counted by the time counters 33, 43_1 and 43_2 is four. Thus, the maximum times counted by the time counters 33, 43_1 and 43_2 are "9999". In this example, if the time counters 33, 43_1 and 43_2 subtract one from 9999 every 1 ms, the time counters 33, 43_1 and 43_2 count from 9999 to zero after 9999 ms. Next micro second, the time counters 33, 43_1 and 43_2 again count from 9999 to zero by subtracting one from 9999 every 1 ms. Accordingly, the time length of each slot is (9999+1) ms.

For another example, if the reset index RI is five, and the digit number of the maximum times counted by the time counters 33, 43_1 and 43_2 is five, the maximum times counted by the time counters 33, 43_1 and 43_2 are "99999". In this example, if the time counters 33, 43_1 and 43_2 add one to zero every 1 ms, and the time counters 33, 43_1 and 43_2 count from zero to 99999, after 99999 ms, the time counters 33, 43_1 and 43_2 count to 99999. On the next micro second, the time counters 33, 43_1 and 43_2 again count from zero to 99999 by adding one to zero every 1 ms. Accordingly, each slot is (99999+1) ms.

It should be noted that, the above examples are only for illustrating but not for restricting how the time length of each slot is determined according to the reset index RI. In addition, how the time counters count time, such as counting time in an increasing way or a decreasing way, is also not restricted by the above examples. However, it is worth mentioning that, in order to make the wireless base station BS_1, the first mobile terminal MS_1 and the second mobile terminal MS_2 able to synchronously generate their time slots, the reset index RI stored in the memories 32, 42_1 and 42_2 have to be equal.

Figure 5:
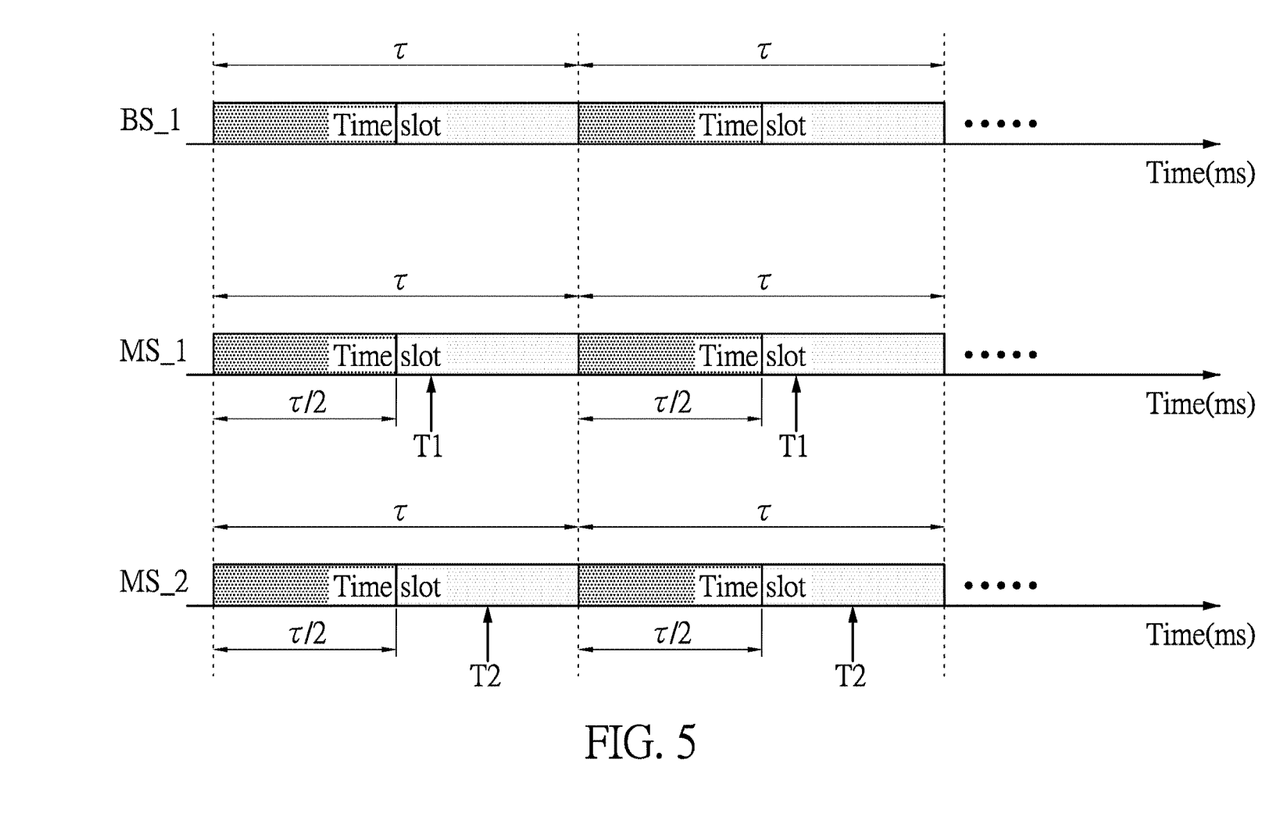
FIG. 5 is a schematic diagram showing time slots generated synchronously by the wireless base station, the first mobile terminal and the second mobile terminal of the indoor positioning system shown by FIG. 2.

Referring to FIG. 5, a schematic diagram showing time slots generated synchronously by the wireless base station, the first mobile terminal and the second mobile terminal of the indoor positioning system shown in FIG. 2 is shown. As shown in FIG. 5, when the time counters 33, 43_1 and 43_2 are simultaneously enabled, the wireless base station BS_1, the first mobile terminal MS_1 and the second mobile terminal MS_2 respectively and synchronously generate a plurality of sequential time slots, and the time length of each time slot is $\tau$. To avoid collisions of the timing when the first mobile terminal MS_1 transmits a first positioning signal S_1 and the timing when the second mobile terminal MS_2 transmits a second positioning signal S_2, the first mobile terminal MS_1 only transmits a first positioning signal S_1 at the first preset time point T1 in each time slot, and the second mobile terminal MS_2 only transmits a second positioning signal S_2 at the second preset time point T2 in each time slot. For example, in each time slot, the first mobile terminal MS_1 transmits a first positioning signal S_1 to the wireless base station BS_1 only when the time counter 43_1 counts to the first preset time point T1. Also, in each time slot, the second mobile terminal MS_2 transmits a second positioning signal S_2 to the wireless base station BS_1 only when the time counter 43_2 counts to the second preset time point T2. It should be noted that, the first preset time point T1 and the second preset time point T2 can be determined by the first identity number ID_1 of the first mobile terminal MS_1 and the second identity number ID_2 of the second mobile terminal MS_2, respectively. The first preset time point T1 and the second preset time point T2 are different because the first mobile terminal MS_1 and the second mobile terminal MS_2 have different identity numbers, which are the first identity number ID_1 and the second identity number ID_2.

The above described first preset time point T1 and second preset time point T2 can be considered the periods of signal transmission set for the first mobile terminal MS_1 and the second mobile terminal MS_2. For example, the time length $\tau$ of each time slot ($\tau$) is 10000, the first preset time point T1 is 2000, and the second preset time point T2 is 3000. That is, in each time slot, the period of signal transmission set for the first mobile terminal MS_1 is 2000 ms and the period of signal transmission set for the second mobile terminal MS_2 is 3000 ms. Under this circumstance, in each time slot, the first mobile terminal MS_1 transmits a first positioning signal S_1 only when the time counter 43_1 counts to 2000, 4000, 6000, 8000 and 10000, and the second mobile terminal MS_2 transmits a second positioning signal S_2 only when the time counter 43_2 counts to 3000, 6000 and 9000. However, the timing when the first mobile terminal MS_1 transmits a first positioning signal S_1 and the timing when the second mobile terminal MS_2 transmits a second positioning signal S_2 may still collide. For example, when the time counter 43_1 and the time counter 43_2 both count to 6000, the first mobile terminal MS_1 transmits a first positioning signal S_1 and the second mobile terminal MS_2 transmits a second positioning signal S_2 at the same time.

To avoid collisions, the first preset time point T1 and the second preset time point T2 are within a range from the half of each time slot ($\frac{1}{2}\tau$) to the end of each time slot ($\tau$). In other words, in each time slot, the period of signal transmission of the first mobile terminal MS_1 and the period of signal transmission of the second mobile terminal MS_2 are required to be ($\tau/2$) ms~$\tau$ ms. In this manner, the least common multiple of the period of signal transmission of the first mobile terminal MS_1 and the period of signal transmission of the second mobile terminal MS_2 is always larger than each time slot ($\tau$). Also, at the beginning of each time slot, the time counter 43_1 of the first mobile terminal MS_1 and the time counter 43_2 of the second mobile terminal MS_2 restart to count for their periods of signal transmission. As a result, the first mobile terminal MS_1 and the second mobile terminal MS_2 will never transmit a positioning signal at the same time.

It is worth mentioning that, the identity number ID_i is a unique identification of the mobile device MS_i. The first identity number ID_1 of the first mobile terminal MS_1 is stored in the memory 42_1 of the first mobile terminal MS_1, and the second identity number ID_2 of the second mobile terminal MS_2 is stored in the memory 42_2 of the first mobile terminal MS_2. In practice, a user can push a button configured on the mobile device MS_i or use other tools to manually input and save the identity number ID_i of the mobile device MS_i into the memory 42_i, but it is not limited thereto. As mentioned, the first identity number ID_1 of the first mobile terminal MS_1 and the second identity number ID_2 of the second mobile terminal MS_2 are unique. Thus, the first preset time point T1 and the second preset time point T2 are always different according to different identity numbers of the first mobile terminal MS_1 and the second mobile terminal MS_2 to assure that the first preset time point T1, and the second preset time point T2 never overlap.

A preset time point T1 at which the mobile terminal MS_i transmits a positioning signal S_i in each time slot can be determined by the identity number ID_i of the mobile terminal MS_i and a reset index RI. Thus, the first preset time point T1 at which the first mobile terminal MS_1 transmits a first positioning signal S_1 in each time slot can be determined by the first identity number ID_1 of the first mobile terminal MS_1 and a reset index RI, and the second preset time point T2 at which the second mobile terminal MS_2 transmits a second positioning signal S_2 in each time slot can be determined by the second identity number ID_2 of the second mobile terminal MS_2 and the reset index RI. The first mobile terminal MS_1 and the second mobile terminal MS_2 have different identity numbers, which are the first identity number ID_1 and the second identity number ID_2, so that the first preset time point T1 and the second preset time point T2 are different. In practice, the first preset time point T1 and the second preset time point T2 can be calculated by the first mobile terminal MS_1 and the second mobile terminal MS_2, respectively, according to an equation. In other words, the identity number ID_i of the mobile terminal MS_i and a reset index RI are supposed to be two variables in the equation for calculating a preset time point T1 at which the mobile terminal MS_i transmits a positioning signal S_i in each time slot. Furthermore, the rule of a preset time point T1 between $\tau/2 \sim \tau$ is also designed in the equation. It should be noted that, this equation can be freely defined by those skilled in the art as long as this equation is relevant to the identity number ID_i of the mobile terminal MS_i and a reset index RI.

For example, when the reset index RI is four (that is, each time slot ($\tau$) in FIG. 5 is 10000), according to the equation, if the first preset time point T1 is 5600, the first mobile terminal MS_1 transmits a first positioning signal S_1 to the wireless base station BS_1 only when the time counter 43_1 counts to 5600 in each time slot. In addition, according to the equation, if the second preset time point T2 is 8600, the second mobile terminal MS_2 transmits a second positioning signal S_2 to the wireless base station BS_1 only when the time counter 43_2 counts to 8600 in each time slot.

For the wireless base station BS_1, when receiving the first positioning signal S_1 and the second positioning signal S_2, the wireless base station BS_1 can obtain the first identity number ID_1 of the first mobile terminal MS_1 and the second identity number ID_2 of the second mobile terminal MS_2 according to the above equation by reversing the equation. As mentioned, the indoor positioning system and method are used in an interior space 10, and thus the distance of signal transmission for the first mobile terminal MS_1 to transmit a first positioning signal S_1 to the wireless base station BS_1 and the distance of signal transmission for the second mobile terminal MS_2 to transmit a second positioning signal S_2 to the wireless base station BS_1 will not be long (for example, the two distances of signal transmission may be less than 10 meters). Accordingly, the signal transmission time that the first mobile terminal MS_1 takes to transmit a first positioning signal S_1 to the wireless base station BS_1 and the signal transmission time that the second mobile terminal MS_2 takes to transmit a second positioning signal S_2 to the wireless base station BS_1 can be considered a constant time When the wireless base station BS_1 receives the first positioning signal S_1 and the second positioning signal S_2, the wireless base station BS_1 can calculate the first identity number ID_1 of the first mobile terminal MS_1 and the second identity number ID_2 of the second mobile terminal MS_2 according to the equation, an arriving time of the first positioning signal S_1, and an arriving time of the second positioning signal S_2. It should be noted that, although the wireless base station BS_1 can calculate the first identity number ID_1 of the first mobile terminal MS_1 and the second identity number ID 2 of the second mobile terminal MS_2, the wireless base station BS_1 cannot obtain information on which pet is wearing the first mobile terminal MS_1 and which pet is wearing the second mobile terminal MS_2. In practice, the information on which pet 101 or 102 is wearing the first mobile terminal MS_1 and which pet 101 or 102 is wearing the second mobile terminal MS_2 is stored in a user's electronic device or a cloud server.

A preset time point T1 at which the mobile terminal MS_i transmits a positioning signal S_i in each time slot, for example, can be set to always be a prime number that is determined by the identity number ID_i of the mobile terminal MS_i. Thus, the first preset time point T1 is set to be a first prime number, the second preset time point T2 is set to be a second prime number. In addition, the first prime number and the second prime number are determined by the first identity number ID_1 and the second identity number ID_2, respectively. A prime number is a natural number greater than 1 that has no positive divisors other than 1 and itself. Therefore, if the first preset time point T1 and the second preset time point T2 are set to be different prime numbers according to the first identity number ID_1 and the second identity number ID_2, the timing when the first mobile terminal MS_1 transmits a first positioning signal S_1 and the timing when the second mobile terminal MS_2 transmits a second positioning signal S_2 will never overlap.

In practice, a look-up table can be stored in the memory 42_1 of the first mobile terminal MS_1 and the memory 42_2 of the second mobile terminal MS_2. This look-up table includes the first identity number ID_1, the first preset time point T1, the second identity number ID_2 and the second preset time point T2. According to the look-up table, the first identity number ID_1 can be mapped to the first preset time point T1 at which the first mobile terminal MS_1 transmits a positioning signal S_1 in each time slot. Also, according to the look-up table, the second identity number ID_2 can be mapped to the second preset time point T2 at which the second mobile terminal MS_2 transmits a positioning signal S_2 in each time slot. When a user manually inputs and saves an identity number ID_i into a memory 42_i of the mobile terminal MS_i by pushing a button configured on the mobile terminal MS_i or by using other tools, the microprocessor 41_i of the mobile terminal MS_i can obtain a preset time point T1 at which the mobile terminal MS_i transmits a positioning signal S_i in each time slot according to the look-up table.

Likewise, this look-up table can also be stored in the memory 32 of the wireless base station BS_1. It should be noted that, the "arriving time" mentioned above can be defined as the sum of a preset time point T1 at which the mobile terminal MS_i transmits a positioning signal S_i in each time slot and the signal transmission time that it takes to transmit a positioning signal S_i between the mobile terminal MS_i and the wireless base station BS_1. Since a preset time point T1 at which the mobile terminal MS_i transmits a positioning signal S_i in each time slot can be considered a constant time, the wireless base station BS_1 can subtract this signal transmission time from the arriving time of the first positioning signal S_1 to obtain the first preset time point T1, and can subtract this signal transmission time from the arriving time of the second positioning signal S_2 to obtain the second preset time point T2. After that, based on the look-up table, the wireless base station BS_1 can obtain the first identity number ID_1 and the second identity number ID_2 according to a difference between the arriving time of the first positioning signal S_1 and the signal transmission time, which is the first preset time point T1, and a difference between the arriving time of the second positioning signal S_2 and the signal transmission time, which is the second preset time point T2, respectively.

From the above, the arriving time includes the signal transmission time that it takes to transmit a positioning signal S_i between the mobile terminal MS_i and the wireless base station BS_1. To prevent a preset time point T1 from influencing a prime number characteristic after adding the signal transmission time, and to allow the wireless base station BS_1 to more accurately obtain an identity number ID_i of a mobile terminal MS_i, a difference between the first preset time point T1 and the second preset time point T2 has to be larger than a threshold. Specifically, the threshold is a constant. The threshold may be set to signal transmission time which means a signal is transmitted between the first mobile terminal MS_1 and the wireless base station BS_1 or between the second mobile terminal MS_2 and the wireless base station BS_1.

In practice, when there are more than two mobile terminals MS_1~MS_N configured in the indoor positioning system 1, a difference between a preset time point T1 at which the mobile terminal MS_i transmits a positioning signal S_i in each time slot and a preset time point Tj at which the mobile terminal MS_j transmits a positioning signal S_j in each time slot has to be larger than a threshold. The mobile terminal MS_i and the mobile terminal MS_j can be any two of the mobile terminals MS_1~MS_N, wherein i and j are different positive integers from 1 to N. Specifically, the threshold is a constant.

In one example, the reset index RI is four, each time slot ($\tau$) in FIG. 5 is (9999+1) ms, and the signal transmission time when a signal is transmitted between the first mobile terminal MS_1 and the wireless base station BS_1 or between the second mobile terminal MS_2 and the wireless base station BS_1 is 500 ms. Under these circumstances, the first mobile terminal MS_1 can choose to transmit a first positioning signal S_1 to the wireless base station BS_1 only when the time counter 43_1 counts to 5387, which is a prime number, in each time slot, and the second mobile terminal MS_2 can choose to transmit a second positioning signal S_2 to the wireless base station BS_1 only when the time counter 43_2 counts to 6301, which is another prime number, in each time slot.

From the above, 5387 and 6301 is within a range from 5000, which is $\tau/2$, to 10000, which is $\tau$. Additionally, a difference between 5387 and 6301, which is 914, is larger than the signal transmission time, which is 500. Thus, in this example, the timing when the first mobile terminal MS_1 transmits a first positioning signal S_1 and the timing when the second mobile terminal MS_2 transmits a second positioning signal S_2 never overlap. The signal transmission collisions between the first mobile terminal MS_1 and the second mobile terminal MS_2 can thus be prevented without decreasing the precision of positioning mobile terminals.

To sum up, by using the indoor positioning system and method provided by the present disclosure, all of the wireless base stations and mobile terminals in the same interior space can synchronously generate their time slots. Further, each mobile terminal transmits a positioning signal only at a preset time point in each time slot to ensure that the timings when the mobile terminals transmit a positioning signal never overlap. In this manner, signal transmission collisions among the mobile terminals can be effectively prevented.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An indoor positioning method for preventing signal transmission collisions, adapted to an indoor positioning system, wherein the indoor positioning system comprises a wireless base station, a first mobile terminal and a second mobile terminal, the wireless base station, the first mobile terminal and the second mobile terminal respectively have a microprocessor, a memory and a time counter, and each memory being configured to store a reset index, the indoor positioning method comprising:

enabling the time counters at the same time by the microprocessors of the wireless base station, the first mobile terminal and the second mobile terminal when one of the wireless base station, the first mobile terminal and the second mobile terminal receives a trigger signal, and synchronously generating a plurality of sequential time slots, wherein each time slot is determined according to the reset index;

storing a first identity number in the memory of the first mobile terminal and storing a second identity number in the memory of the second mobile terminal;

transmitting a first positioning signal from the first mobile terminal to the wireless base station when the time counter of the first mobile terminal counts to a first preset time point;

transmitting a second positioning signal from the second mobile terminal to the wireless base station when the time counter of the second mobile terminal counts to a second preset time point, and positioning the first mobile terminal and the second mobile terminal by the wireless base station according to the first positioning signal and the second positioning signal, respectively;

wherein the first preset time point and the second preset time point are determined by the first identity number and the second identity number, respectively, and the first preset time point and the second preset time point are within a range from the half of each time slot to the end of each time slot.

2. The indoor positioning method according to claim 1, wherein the first preset time point is determined by the first identity number and the reset index, the second preset time point is determined by the second identity number and the reset index, and the first preset time point and the second preset time point are not equal.

3. The indoor positioning method according to claim 2, wherein the first preset time point and the second preset time point are determined by an equation.

4. The indoor positioning method according to claim 3, wherein the wireless base station calculates the first identity number and the second identity number according to the equation, an arriving time of the first positioning signal and an arriving time of the second positioning signal.

5. The indoor positioning method according to claim 1, wherein the first preset time point is a first prime number, the second preset time point is a second prime number, and the first prime number and the second prime number are determined by the first identity number and the second identity number, respectively.

6. The indoor positioning method according to claim 1, wherein a difference between the first preset time point and the second preset time point is larger than a threshold, and the threshold is a constant.

7. The indoor positioning method according to claim 6, wherein a look-up table is stored in the memory of the first mobile terminal and the memory of the second mobile terminal, the look-up table includes the first identity number, the first preset time point, the second identity number and the second preset time point, and the first identity number corresponds to the first preset time point and second identity number corresponds to the second preset time point.

8. The indoor positioning method according to claim 7, wherein the look-up table is further stored in the memory of the wireless base station, and based on the look-up table, the wireless base station obtains the first identity number and the second identity number according to a difference between the arriving time of the first positioning signal and the signal transmission time and a difference between the arriving time of the second positioning signal and the signal transmission time, respectively.

9. An indoor positioning system for preventing signal transmission collisions, comprising:
a wireless base station;
a first mobile terminal; and
a second mobile terminal;
wherein the wireless base station, the first mobile terminal and the second mobile terminal are configured in an interior space, the wireless base station, the first mobile terminal and the second mobile terminal respectively have a microprocessor, a memory and a time counter, and each memory is configured to store a reset index;
wherein the microprocessors of the wireless base station, the first mobile terminal and the second mobile terminal enable the time counters at the same time when one of the wireless base station, the first mobile terminal and the second mobile terminal receives a trigger signal, such that the wireless base station, the first mobile terminal and the second mobile terminal synchronously generate a plurality of sequential time slots, and each time slot is determined according to the reset index;
wherein a first identity number is stored in the memory of the first mobile terminal, a second identity number is stored in the memory of the second mobile terminal, a first positioning signal is transmitted from the first mobile terminal to the wireless base station when the time counter of the first mobile terminal counts to a first preset time point, a second positioning signal is transmitted from the second mobile terminal to the wireless base station when the time counter of the second mobile terminal counts to a second preset time point, the first mobile terminal and the second mobile terminal are positioned by the wireless base station respectively according to the first positioning signal and the second positioning signal;
wherein the first preset time point and the second preset time point are determined by the first identity number and the second identity number, respectively, and the first preset time point and the second preset time point are within a range from the half of each time slot to the end of each time slot.

10. The indoor positioning system according to claim 9, wherein the first preset time point is determined by the first identity number and the reset index, the second preset time point is determined by the second identity number and the reset index, and the first preset time point and the second preset time point are not equal.

11. The indoor positioning system according to claim 10, wherein the first preset time point and the second preset time point are determined by an equation.

12. The indoor positioning system according to claim 11, wherein the wireless base station calculates the first identity number and the second identity number according to the equation, an arriving time of the first positioning signal and an arriving time of the second positioning signal.

13. The indoor positioning system according to claim 9, wherein the the first preset time point is a first prime number, the the second preset time point is a second prime number, and the first prime number and the second prime number are determined by the first identity number and the second identity number, respectively.

14. The indoor positioning system according to claim 9, wherein a difference between the first preset time point and the second preset time point is larger than a threshold, and the threshold is a constant.

15. The indoor positioning system according to claim 14, wherein a look-up table is stored in the memory of the first mobile terminal and the memory of the second mobile terminal, the look-up table includes the first identity number, the first preset time point, the second identity number and the second preset time point, and the first identity number corresponds to the first preset time point and second identity number corresponds to the second preset time point.

16. The indoor positioning system according to claim 15, wherein the look-up table is further stored in in the memory of the wireless base station, and based on the look-up table, the wireless base station obtains the first identity number and the second identity number according to a difference between the arriving time of the first positioning signal and the signal transmission time and a difference between the arriving time of the second positioning signal and the signal transmission time, respectively.

* * * * *